United States Patent Office 3,836,597
Patented Sept. 17, 1974

3,836,597
HYDROCARBON ISOMERIZATION PROCESS
Swan T. Sie, Amsterdam, Netherlands, assignor to Shell Oil Company, New York, N.Y.
No Drawing. Filed Mar. 5, 1973, Ser. No. 338,113
Claims priority, application Netherlands, Apr. 25, 1972, 7205563
Int. Cl. C07c 5/24
U.S. Cl. 260—683.65    9 Claims

ABSTRACT OF THE DISCLOSURE

A decline of the activity of Pt/mordenite isomerization catalysts is prevented when during calcination and/or regeneration at temperatures between 350–530° C. the water vapor pressure in the gas surrounding the catalyst is such that the logarithm of this pressure (in mm. mercury) is between $T-450/50$ and 2.8 T being the temperature in degrees C.

BACKGROUND OF THE INVENTION

The invention relates to a process for the isomerization of aliphatic saturated hydrocarbons at a temperature of not more than 300° C. with a catalyst comprising one or more platinum-group metals supported on a hydrogen-mordenite (H-mordenite).

For use in gasolines unbranched saturated aliphatic hydrocarbons are less suitable, because they have a lower octane number than branched aliphatic and aromatic hydrocarbons having the same number of carbon atoms. For this reason processes have been developed for the isomerization of unbranched aliphatic saturated hydrocarbons having at least 4, and in particular 5 and 6 carbon atoms, to branched, aliphatic hydrocarbons. It has been found that for processes of this type, which are carried out at temperatures below 300° C., H-mordenites on which one or more platinum group metals have been supported are very suitable as catalysts.

Mordenites are crystalline natural or synthetic zeolites of the alumino-silicate type; they have a general composition, expressed as moles of oxide, of $1.0\pm0.2$ $Na_2O.Al_2O_3$, $10\pm0.5$ $SiO_2$, the amount of $SiO_2$ may also be larger. Instead of all or part of the sodium, other alkali metals and/or alkaline earth metals may be present.

In this application mordenites are also taken to include mixtures of crystalline mordenite and other materials, which latter may also be amorphous. In general the mordenites which are suitable for use in the catalysts for the process according to the invention contain at least 50% and in general at least 80% of crystalline mordenite.

By H-mordenite is meant a mordenite in which the cations present have all or for the greater part been replaced by hydrogen ions.

The metals of the platinum metal group are ruthenium, rhodium, palladium, osmium, iridium and platinum.

The catalysts are generally used as shaped particles such as pills, beads, granules, cylinders, tablets and the like.

Although the isomerization takes place at a temperature of at most 300° C. the catalyst sometimes has to be exposed to higher temperatures, e.g., before use or during regeneration. As a result the properties of the catalyst may be so modified that the use of the catalyst for isomerization leads to less satisfactory results as regards activity and selectivity.

SUMMARY OF THE INVENTION

Aliphatic saturated $C_4$–$C_6$ hydrocarbons are isomerized at a temperature of not more than 300° C. with a catalyst comprising one or more platinum group metals supported on H-mordenite, said catalyst having been heated at temperatures between 350° C. and 530° C. during periods prior to the isomerization in the presence of a gas having a partial water vapor pressure, $P_{H_2O}$, expressed in mm. of Hg, in the range $$\frac{T-450}{50} < \log P_{H_2O} < 2.8,$$

where T represents the temperature in ° C. and log $P_{H_2O}$ is the Briggs logarithm of $P_{H_2O}$.

The logarithm $P_{H_2O}$ is preferably less than 2.2 and in general use will be made of a water vapor pressure the logarithm of which is only slightly greater than $T-450/50$.

DETAILED DESCRIPTION

The mordenite used can be natural or synthetic mordenite. The following method may very suitably be used for the preparation of synthetic mordenite: an aqueous alkaline mixture having a composition expressed as moles of the oxides of $1.22.8$ $Na_2O \cdot Al_2O \cdot Al_2O_3 \cdot 9.5$–$12.5$ $SiO_2 \cdot 60$–$300$ $H_2O$, which contains amorphous silica-alumina, sodium hydroxide and water, is heated under pressure for 4–40 hours to a temperature of 180° C.–260° C. and the resultant mordenite is subsequently separated from the mother liquor. Instead of using all or part of the sodium as hydroxide it is also possible to employ sodium salts or polybasic acids having for the highest dissociation step a pK-value measured at 18° C. which is higher than 10, such as sodium phosphate. The mordenite preparation may then be carried out at a slightly lower temperature, for example 140° C.–180° C. The resultant mordenite usually has the form of a crystalline powder.

The cations in natural or synthetic mordenite can be replaced by hydrogen ions by treating the mordenite for example with an aqueous solution of an acid (for example hydrochloric acid), as a result of which cations are exchanged for hydrogen ions, or by treatment for example with an aqueous solution of an ammonium salt (by which is meant a salt of ammonia, an amine, hydroxyl amine or hydrazine) as a result of which cations are exchanged for ammonium ions and a mordenite known as $NH_4$-mordenite is obtained, followed by calcining so that the nitrogen base present is decomposed.

If it is desired to use the mordenite in the form of larger particles, it may be mixed with an inert binder such as natural clays (for example kaolin or bentonite) and/or synthetic inorganic oxides such as alumina, silica, boria and zirconia or combinations thereof, such as silica-alumina and silica-zirconia. If a natural clay is used, any exchangeable metal ions present therein are advantageously replaced by ammonium ions (for example by treatment with an aqueous solution of an ammonium compound) before mixing the clay with H-mordenite or $NH_4$-mordenite. Particles having the desired size, such as pills, tablets, beads, spheres, briquettes, granules, can be prepared from the mixture. Granules having a diameter of at least 0.5 mm. or cylinders of approximately 3 mm. are very suitable. The ammonium compounds present in the clay and in any $NH_4$-mordenite present are decomposed by calcining.

The metal or metals of the platinum group can be supported on the H-mordenite by known techniques, such as impregnation percolation, ion exchange with generally aqueous solutions of compounds of one or more of the said metals. Ion exchange is particularly suitable for loading the H-mordenite, in particular exchange with the aid of compounds in which the metal in question is present as cation, such as platinum or palladium complexes obtained with the aid of ammonia, hydrazine, hydroxyl amine or alkyl amines. The loading with platinum-group metals can be carried out with H-mordenite or with an $NH_4$-mordenite. In the latter case H-mordenite on which one or more metals of the platinum group have been supported is only formed after calcination.

In preparing an H-mordenite loaded with a platinum-group metal, an NH$_4$-mordenite may also very suitably be impregnated with a salt of one or more of these metals dissolved in an aqueous solution of an ammonium salt, for example ammonium formate. After activation by calcining, a metal-loaded H-mordenite is obtained.

Catalysts containing 0.1–1% by weight of one or more platinum-group metals, preferably platinum, based on the total catalyst, are very suitable for the isomerization of hydrocarbons.

To activate the catalysts, the H-mordenites or NH$_4$-mordenites (if desired mixed with natural clays in for example the ammonium form) which have been treated with a solution of a compound of one or more platinum-group metals, are generally calcined, i.e., treated with an oxygen-containing gas (preferably air), at maximum temperatures of from 350° C. to 530° C. It is advantageous to have the calcination at a temperature of 350° C. to 530° C. preceded by calcination at a lower temperature (for example 300° C.–350° C.), in order to prevent sintering of the platinum-group metal and destruction of active sites in the H-mordenite.

According to the invention the gas used must contain such an amount of water that the water vapor pressure (Expressed in mm. Hg) satisfies the above-mentioned relationship $$\frac{T-450}{50} < \log P_{H_2O} < 2.8.$$

When the water vapor pressure is outside this range, catalysts are obtained which do not have optimum activity and/or selectivity for the isomerization of hydrocarbons.

Before the catalyst is contacted with the hydrocarbon or mixture of hydrocarbons to be isomerized, it is sometimes treated with hydrogen at a temperature between 350° C. and 530° C. in order to reduce the platinum-group metal to the metallic form. During this treatment the water vapor pressure must also satisfy the above-mentioned relationship.

By "periods prior to isomerization" are meant those periods during which the catalyst is at a temperature between 350° C. and, 530° C. without being in contact with the hydrocarbons to be isomerized. These periods occur during the activation of a fresh catalyst as described above, but also during the regeneration of a catalyst already used. Although a fresh catalyst which has been treated during the activation with a gas in which P$_{H_2O}$, expressed in mm. Hg, satisfiies the relationship $$\frac{T-450}{50} < \log P_{H_2O} < 2.8$$

has a very long life, circumstances may arise within relatively short periods of time which will require regeneration, for example if the process is not carried out in the correct manner (misoperation). These periods can vary from about one-half hour to 40 hours or more.

The attractiveness of an isomerization catalyst is judged on the basis of quality and yield of the hydrocarbon mixtures which can be obtained with the aid of the catalyst. The octane number of the product obtained after isomerization, starting from a given hydrocarbon feed mixture, can be used as a criterion for this quality. When the attractiveness of a catalyst declines during use regeneration may become essential.

When a catalyst requires regeneration, carbon or carbonaceous compounds have frequently deposited thereon. The regeneration can be carried out with a hydrogen-containing gas in which the water vapor pressure satisfies the said relationship at a temperature between for example 350° C. and 450° C.

The regeneration is preferably carried out with an oxygen-containing gas. It is very suitable first to pass an inert gas, for example nitrogen, over the catalyst while heating the catalyst to a temperature between 200° C. and 225° C., whereupon a small amount of oxygen, for example 0.1–2% by volume, is added to the inert gas. Subsequently the temperature is slowly raised to a maximum between 380° C. and 450° C., care being taken to ensure that the amount of water present is such that the water vapor pressure prevailing at temperatures in excess of 350° C. satisfies the relationship $$\frac{T-450}{50} < P_{H_2O} < 2.8.$$

Naturally, water vapor may also be present at temperatures below 350° C. during said regeneration process. If desired, the regeneration is carried out with an oxygen-containing gas at slightly elavated pressure, very suitably 5 to 10 kg./cm.$^2$. Gas rates of 500–1000 liters/liter of catalyst/hour are very suitable.

The isomerization of aliphatic hydrocarbons which must of course contain at least 4 carbon atoms is generally carried out in the presence of hydrogen at temperatures between 200° C. and 300° C. The hydrogen partial pressure may vary between 3 and 70 kg./cm.$^2$ and more preferably between 5 and 50 kg./cm.$^2$. The space velocity may be between 0.5 and 10 liter of liquid hydrocarbon feed per liter of catalyst per hour and the gas supply between 100 and 2500 liters of hydrogen per kg. of feed. The hydrogen/feed molar ratio may vary between wide limits and is normally between 0.5:1 and 10:1. Preferably, space velocities of 1 to 3 liters of hydrocarbon feed/liter of catalyst/hour and a hydrogen/feed molar ratio of 1:1 to 3:1 are used; combination of, for example, a space velocity of 1 liter of hydrocarbon feed/liter of catalyst/hours and a hydrogen/feed molar ratio of 2.5, or a space velocity of 2 liters of hydrocarbon feed/liter of catalyst/hour and 2 hydrogen/feed molar ratio of 1.25 are very suitable.

The feed used may be pure hydrocarbons such as pentane, or technical mixtures which contain hydrocarbons having for example 4 to 6 carbon atoms, such as tops which become available in the distillation of petroleum. The feed may also contain olefinically unsaturated hydrocarbons, which may participate in the isomerization process. The presence of small amounts of aromatic compounds (for example benzene) and sulfur compounds has no adverse effect on the isomerization reaction or on the life of the catalyst.

In the case of a mixture of straight and branched paraffins, for example tops, of which the straight paraffins are to be converted into branched paraffins by isomerization, the branched paraffins may if desired be completely or partly removed from the mixture before it is subjected to the isomerization process according to the invention. This may very suitably be effected with the aid of molecular sieves or distillation.

Naturally, paraffins having straight chains (for example n-pentane) will still occur in the product obtained after the isomerization. These are advantageously separated from the branched paraffins, for example, by distillation or with the aid of molecular sieves, and are subsequently again subjected to the isomerization process according to the invention, preferably by adding these unbranched paraffins to fresh feed.

It is also possible to add the product obtained after the isomerization to the original mixture of straight and branched paraffins, to remove from the resultant mixture, all or a portion of the branched paraffins (for example by distillation or with the aid of molecular sieves) and to subject the remaining portion of the latter mixture to the isomerization process to the invention.

EXAMPLE I

Preparation of a Pt/H-mordenite catalyst based on mordenite extrudates

Step A.—1 kg. of sodium mordenite (1/16 "Sodium Zeolon extrudates from the Norton Company) was contacted with 10 liters of a 2-molar hydrochloric acid solution and the product was heated at 100° C. for one hour. The solid material was subsequently filtered off, washed with 5 liters of deionized water and then introduced into a glass column. A 2-molar solution of $NH_4NO_3$ in water was percolated through the bed until hardly any sodium could be traced in the effluent.

Step B.—The solid material obtained after step A was then contacted with 2.5 liter of a 2-molar solution of $NH_4NO_3$ in water. By adding some $NH_4OH$ the pH was adjusted at 7 and 2.3 g. of platinum in the form of a solution of $Pt(NH_3)_4Cl_2$ in water was added to the suspension. The suspension was then heated to 50° C. and maintained at this temperature for 16 hours with stirring. The supernatant liquid was subsequently decanted and the solid matter was then washed with 1 liter of deionized water.

Step C.—The material obtained in step B was dried in air at 120° C. The dried material was subsequently heated in an airstream to 350° C. and maintained at this temperature for one hour. While maintaining the water vapor pressure in the air stream at 15 mm. Hg, the temperature was then gradually raised to 500° C. over a period of 4 hours and maintained at this value for 3 hours. The calcined material was cooled in the said air stream to 350° C. and subsequently cooled down in stagnant air to room temperature. The partial water pressure during heating above 350° C. is in accordance with the invention.

EXAMPLE II

Preparation of Pt/H-mordenite catalysts based on powdery mordenite

Example IIA.—1 kg. of sodium mordenite (sodium Zeolon powder from the Norton Company) was converted with HCl and with $NH_4NO_3$ in the manner described in Example I, Step A. The material was subsequently contacted with 2.5 liters of a 2-molar solution of $NH_4NO_3$ in water. By adding some $NH_4OH$ the pH was adjusted at 7 and 2.3 g. of platinum was subsequently added as a solution of $Pt(NH_3)_4Cl_2$ in water. The suspension was then heated to 50° C. and maintained at this temperature for 16 hours with stirring. The slurry was subsequently filtered. The solid material was washed with deionized water and dried in air at 100° C. The dried material was subsequently pressed into 3 x 3 mm. pills, which were calcined in the manner described in Example I, Step C.

Example IIB.—1 kg. of sodium mordenite powder was converted to $NH_4$-mordenite in the manner described in Example I, Step A. The material was washed with water and dried in air at 100° C.

40 g. of the dried material was impregnated with 34 ml. of a solution of 0.203 g. of $Pt(NH_3)_4Cl_2$ in 2-molar ammonium formate. After standing for 15 minutes the impregnated material was washed with deionized water and subsequently dried in air at 120° C. The dried material was pressed into pills (size 3 x 3 mm.) which were calcined as described in Example I, Step C.

Example IIC.—Starting from sodium mordenite powder, an extruded catalyst was prepared. The procedure followed to obtain dry powdery Pt/$NH_4$-mordenite was similar to the procedure described in Example IIB. After the dried material had been mixed with 20% by weight of alumina as binder and after addition of water, it was worked up by kneading into a doughy substance which was subsequently extruded to extrudates having a diameter of approximately 1.5 mm. The extrudates were dried and calcined as described in Example I, Step C.

EXAMPLE III

Separate portions of the catalyst prepared in accordance with Example I were subjected to a treatment with hydrogen (prereduction) under varying conditions. The activity was then determined for the isomerization of sulfur-free n-hexane under the following conditions.

Temperature _____ 240° C.
Pressure _____ 30 kg./cm.$^2$.
Space velocity of n-hexane __ 1 kg./kg. of catalyst/hour.
$H_2$/n. $C_6$ molar ratio _____ 2.5.
Water in gas _____ 10 p.p.m. v./v.

The "prereduction" conditions and the results of the isomerization tests are given in the following Table.

TABLE A

| | Experiment | | |
|---|---|---|---|
| | 3A | 3B | 3C |
| Conditions of pretreatment with hydrogen: | | | |
| Temperature | 500 | 500 | 500 |
| Pressure, kg./cm.$^2$ | 30 | 30 | 1 |
| $H_2$ flow, Nl.l$^{-1}$.h$^{-1}$ | 2,000 | 2,000 | 2,000 |
| Time, hours | 1 | 1 | 1 |
| $H_2O$ in $H_2$, p.p.m. v./v | 500 | 10 | 10 |
| $PH_2O$ mm. Hg | 12 | 0.23 | 0.008 |
| Isomerization results: | | | |
| Conversion of n-$C_6$, percent | 69.8 | 62.0 | 57.1 |
| Iso-$C_6$ in product, percent by weight | 68.8 | 61.1 | 53.2 |
| Cracking products below $C_6$, percent by weight | 1.0 | 0.9 | 3.9 |

In experiments 3A, 3B and 3C the temperature of the pretreatment is the same but the water content of the hydrogen differs. In experiment 3A the water vapor pressure during the pretreatment with $H_2$ is in agreement with the invention, whereas in experiments 3B and 3C it is not. Experiment 3A clearly yields better isomerization results than experiment 3B or 3C.

EXAMPLE IV

Samples of catalysts prepared in accordance with Examples IIA and IIB were subjected to prereduction under the conditions of experiment 3A of Example III, i.e., in accordance with the invention. The catalyst samples were subsequently tested for the isomerization of n-hexane, both in the absence of sulfur and in the presence thereof (as t-butyl mercaptan), under the following conditions:

Temperature _____ 260° C.
Pressure _____ 30 kg./cm.$^2$.
Space velocity of n-hexane __ 2 kg./kg. of catalyst/hour.
$H_2$/n-$C_6$ molar ratio _____ 2.5.
Water in gas _____ 10 p.p.m. v./v.

The results are given in Table B below.

TABLE B

| | Catalyst in accordance with— | | | |
|---|---|---|---|---|
| | Example IIA | | Example IIB | |
| Sulfur in n-hexane feed, p.p.m., w./w | 0 | 100 | 0 | 100 |
| Yield of $C_6$ and higher, percent by weight | 98.1 | 96.9 | 98.4 | 97.1 |
| Iso-$C_6$ in product, percent by weight | 72.6 | 76.7 | 72.6 | 78.4 |

It can be seen from the above Table that the isomerization activity for sulfur-free and sulfur-containing n-hexane after prereduction with hydrogen in accordance with the invention is satisfactory.

EXAMPLE V

A catalyst prepared in accordance with Example I which was analogous to but not identical with the catalyst used in Example III, was divided into portions and each portion was pretreated separately with hydrogen and then tested for the isomerization of sulfur-free n-hexane under the following conditions:

Temperature _____ 250° C.
Pressure _____ 30 kg./cm.$^2$.
Space velocity of n-hexane __ 2 kg./kg. of catalyst/hour.
$H_2$/n-$C_6$ molar ratio _____ 2.5.
Water in gas _____ 10 p.p.m. v./v.

The hydrogen pretreatment conditions and the results of the isomerization experiments are given in Table C.

TABLE C

| | Experiment | | |
|---|---|---|---|
| | 5A | 5B | 5C |
| Hydrogen pretreatment conditions: | | | |
| Temperature, °C | 400 | 425 | 450 |
| Pressure, kg./cm.$^2$ | 30 | 30 | 30 |
| $H_2$-flow, Nl.l$^{-1}$.h$^{-1}$ | 2,000 | 2,000 | 2,000 |
| Time, hours | 3 | 3 | 3 |
| $H_2O$ in $H_2$, p.p.m. v./v | 10 | 10 | 10 |
| $P_{H_2O}$, mm. Hg | 0.23 | 0.23 | 0.23 |
| Isomerization results: | | | |
| Conversion of n-$C_6$, percent | 58.7 | 53.6 | 51.7 |
| Iso-$C_6$ in products, percent by weight | 58.0 | 52.8 | 50.9 |
| Cracking products below $C_5$, percent by weight | 0.7 | 0.8 | 0.8 |

In the pretreatment with $H_2$, the water vapor pressure in experiments 5A, 5B and 5C was the same, but different temperatures were used. Experiment 5A is in accordance with the invention, experiments 5B and 5C are not. In experiment 5A clearly better results were obtained than in experiment 5B or 5C.

EXAMPLE VI

Portions of the same catalyst as used in Example III were pretreated with hydrogen under varying conditions and subsequently tested for isomerization of a desulfurized $C_5/C_6$ fraction ("tops") obtained by distillation of a Middle East crude oil. This fraction contained 29.7% by weight of iso+normal $C_5$ and 0.7 p.p.m. w./w. of sulfur. The $C_5/C_6$ weight ratio was 0.48 and the quantity of iso-$C_5$-paraffins was 22.9%. The Research octane number (unleaded, RON—O) was 62.1.

Isomerization conditions:
- Temperature _____ 260° C.
- Pressure _____ 30 kg./cm.$^2$.
- Space velocity of tops __ 1 kg./kg. of catalyst/hour.
- $H_2$/tops ratio _____ 500 Nl.l$^{-1}$.
- $H_2O$ in gas _____ 200 p.p.m. v./v.

The hydrogen pretreatment conditions and the results of the isomerization experiments are given in Table D below.

TABLE D

| | Experiment | | | |
|---|---|---|---|---|
| | 6A | 6B | 6C | 6D |
| Hydrogen pretreatment conditions: | | | | |
| Temperature, °C | 355 | 352 | 355 | 500 |
| Pressure, kg./cm.$^2$ | 30 | 30 | 3 | 30 |
| $H_2$-flow, Nl.l$^{-1}$.h$^{-1}$ | 560 | 560 | 2,000 | 2,000 |
| Time, hours | 1 | 16 | 48 | 4 |
| $H_2O$ in $H_2$, p.p.m. v./v | 5 | 5 | 5 | 5 |
| $P_{H_2O}$ mm. Hg | 0.12 | 0.12 | 0.012 | 0.12 |
| Isomerization results: | | | | |
| Yield of $C_5$ and higher, percent by weight | 97.0 | 96.9 | 97.1 | 94.9 |
| Iso-$C_5$ in $C_5$-paraffins, percent | 62.8 | 63.6 | 60.9 | 60.6 |
| Octane number of product higher than $C_5$, RON—O | 77.9 | 77.7 | 77.1 | 76.8 |

In experiments 6A and 6B the hydrogen pretreatment conditions are in accordance with the invention, in experiments 6C and 6D they are not. In experiment 6C the partial water pressure during the pretreatment is only slightly below that according to the invention.

Better results were obtained in experiments 6A and 6B than in experiment 6C or 6D. Particularly in the case of experiment D the results are clearly inferior: not only is the degree of isomerization lower (which is demonstrated inter alia by a lower octane number of the product), the yield is also lower.

EXAMPLE VII

A catalyst prepared as described in Example IIC was used for the isomerization of a desulfurized $C_5/C_6$-fraction of a Middle East crude oil under the conditions specified in Example VI. The catalyst used was divided into portions and each portion was subjected separately to a regeneration process. This comprised heating the catalyst (at 1 atm.) in a stream of pure nitrogen (12,000 Nl. kg.$^{-1}$·h.$^{-1}$) to 300° C. At this temperature 0.65% by volume of $O_2$ was added to the nitrogen and the temperature was gradually raised over a period of approximately 4 hours. In the temperature range above 350° C. water was optionally added to the $O_2$-containing nitrogen stream.

The regenerated catalysts were subsequently tested for isomerization activity with sulfur-free n-pentane as feed under the following conditions:

- Prereduction in $H_2$ _____ As in Example III, test 3A (viz. in accordance with the invention).
- Temperature _____ 250° C.
- Pressure _____ 30 kg./cm.$^2$.
- $H_2/C_5$ molar ratio _____ 2.5.
- Space velocity of n.$C_5$ ____ 2 kg./kg. of catalyst/hour.
- $H_2O$ in gas _____ 10 p.p.m. v./v.

The circumstances which were varied during regeneration and the results of the isomerization experiment are given in the following Table E.

TABLE E

| Experiment | Maximum temperature during regeneration, °C | $P_{H_2O}$ maintained during heating above 350° C., mm. Hg | Conversion of n-$C_5$, percent |
|---|---|---|---|
| 7A (fresh cat.) | | | 46.0 |
| 7B | 500 | 7 | 38.3 |
| 7C | 400 | 7 | 43.5 |
| 7D | 500 | 700 | 3.8 |
| 7E | 500 | 700 | 2.9 |
| 7F | 450 | 15 | 43.8 |
| 7G | 500 | 15 | 46.7 |

In the case of experiments 7C, 7F and 7G the partial water pressure during heating above 350° C. is in accordance with the invention. In experiment 7B the water vapor pressure is lower than according to the invention. In experiments 7D and 7E the water vapor pressure is higher than according to the invention.

In experiments 7C, 7F and 7G the activity after the regeneration process is equal or substantially equal to that of the fresh catalyst, in the other instances the activity of the catalyst is considerably lower.

EXAMPLE VIII

A catalyst prepared as described in Example IIC which was analogous to but not identical with the catalyst used in Example VII was divided into two portions. One of the portions was subjected to a (second) calcination in an air stream at 450° C. and 1 atm. for 3 hours. The water content of the air used was approximately 10 p.p.m. v./v. which corresponds to a water vapor pressure of approximately 0.01 mm. Hg (i.e., lower than according to the invention). After this treatment the catalyst was tested for isomerization of a desulfurized $C_5/C_6$-fraction obtained by distillation of a Middle East crude oil. The isomerization conditions and the feed used were the same as in Example VI. The hydrogen pretreatment was effected in accordance with Example VI, experiment 6A.

For comparison, the other portion of catalyst was tested as such, i.e., without the second calcination step, for isomerization activity under identical conditions.

The results are given in the following Table F.

TABLE F

| | Untreated catalyst | Catalyst calcined in air at 450° C., $P_{H_2O}$= 0.01 mm. Hg |
|---|---|---|
| Yield of $C_5$ and higher, percent by weight | 97.9 | 98.8 |
| Iso-$C_5$ in $C_5$ paraffins, percent | 62.3 | 46.1 |
| Octane number of $C_5$ and higher, RON—O | 77.9 | 72.7 |

It can be seen from the Table that the calcination at 450° C. at which the water vapor pressure is lower than according to the invention results in a catalyst having poor properties for the isomerization of $C_5$–$C_6$ paraffins.

EXAMPLE IX

A catalyst prepared as described in Example IIC, which was analogous to but not identical with the catalyst used in Examples VII and VIII, was divided into two portions. One of the catalysts was subjected to a (second) calcination in air for 3 hours at 500° C., a water vapor pressure of 15 mm. Hg being maintained, i.e., in accordance with the invention. After this calcination, the catalyst was tested for isomerization of a desulfurized $C_5/C_6$ fraction obtained by distillation of a Middle East crude oil. This $C_5/C_6$ fraction had the following properties: iso+normal $C_5$—37.7% by weight, $C_5/C_6$ weight ratio—0.69, sulfur content—less than 1 p.p.m w./w., iso-$C_5/C_6$ paraffins—35.6%, Research Octane Number (unleaded, RON—O)—64.3.

The isomerization conditions and the hydrogen pretreatment were the same as in Example VIII and Example VI, experiment 6A.

For comparison, the other portion of catalyst was treated as such, i.e., without the second calcination step, for isomerization activity under identical conditions.

The results are summarized in the following Table G.

TABLE G

| | Untreated catalyst | Catalyst calcined in air at 500° C., $P_{H_2O}$=15 mm. Hg |
|---|---|---|
| Yield of $C_5$ and higher, percent by weight | 97.5 | 97.1 |
| Iso-$C_5$ in $C_5$ paraffins, percent | 62.9 | 62.8 |
| Octane number of $C_5$ and higher, RON—O | 78.2 | 78.2 |

The above results show that provided the water vapor pressure is maintained in accordance with the invention, repetition of the calcining step used in the preparation has no or hardly any adverse effect on a good isomerization catalyst; this is contrary to the calcination step described in Example VIII in which the water vapor pressure was lower than according to the invention.

EXAMPLE X

A catalyst prepared as described in Example IIC, which was analogous to but not identical with the catalyst used in the Examples VII, VIII and IX, was used for the isomerization of a desulfurized $C_5/C_6$ fraction ("tops") obtained by distillation of a Middle East crude oil.

These "tops" had the following properties: iso+normal $C_5$: 48.8% by weight; $C_5/C_6$ weight ratio: 1.0; iso-$C_5/C_6$ paraffins: 38.3%, Research Octane Number (unleaded, RON—O): 68.9. Sulfur content: originally less than 1 p.p.p. w./w., but raised to 14 p.p.p. w./w. by addition of t-butyl mercaptan.

Before the isomerization the catalyst was pretreated with hydrogen in accordance with the invention as described in Example VI, experiment 6A.

The isomerization conditions and the results are given in the following Table.

TABLE H

| | Experiment | | |
|---|---|---|---|
| | 10A | 10B | 10C |
| Temperature, ° C | 260 | 260 | 260 |
| Pressure, kg./cm.² | 24 | 24 | 24 |
| Space velocity, l.l⁻¹.h⁻¹ | 1.1 | 2.0 | 2.0 |
| $H_2$/tops molar ratio | 2.5 | 2.5 | 1.5 |
| Yield of $C_5$ and higher, percent by weight | 95.8 | 97.0 | 95.5 |
| Iso-$C_5/C_5$ paraffins, percent | 66.1 | 61.6 | 65.2 |
| Octane number of $C_5$ and higher, RON—O | 79.7 | 78.6 | 79.7 |

It can be seen from the above Table that when the space velocity of the feed is increased, the isomerization deteriorates, unless the $H_2$/tops molar ratio is decreased simultaneously as the space velocity is increased.

EXAMPLE XI

A mixture of n-pentane and n-hexane in a weight ratio of 1:0.75 was passed over the same catalyst as in Example X to simulate the feed for an isomerization process obtained by separating, for example by distillation or with the aid of molecular sieves, the normal paraffins from the other hydrocarbons in a $C_5/C_6$ crude oil fraction combined with the product of the isomerization process.

As in Example X, 14 p.p.m. w./w. of sulfur in the form of t-butyl mercaptan were added to the feed. The catalyst was pretreated with hydrogen in accordance with the invention and as described in Example VI, experiment 6A. The isomerization conditions and the results are summarized in the following Table I.

TABLE I

| | Experiment | |
|---|---|---|
| | 11A | 11B |
| Temperature, ° C | 270 | 270 |
| Pressure, kg./cm.² | 8 | 11 |
| Space velocity, l.l⁻¹.h⁻¹ | 2.0 | 2.0 |
| $H_2$/feed molar ratio | 3.0 | 3.0 |
| Yield of $C_5$ and higher, percent by weight | 95.3 | 96.1 |
| Iso-$C_5/C_5$ paraffins, percent | 58.4 | 57.0 |
| Iso-$C_6/C_6$ paraffins, percent | 88.5 | 87.6 |
| Octane number of $C_5$ and higher, RON—O | 77.9 | 77.4 |

This example shows that a catalyst pretreated in accordance with the invention is quite useful for the isomerization of n-$C_5$ and n-$C_6$ in a combined process of iso/normal separation and isomerization.

What is claimed is:

1. A process for the isomerization of aliphatic saturated $C_4$–$C_6$ hydrocarbons at a temperature of not more than 300° C. with a catalyst comprising one or more platinum-group metals supported on an H-mordenite, said catalyst having been heated at temperatures between 350 and 530° C. during periods prior to isomerization in the presence of a gas having a partial water vapor pressure, $P_{H_2O}$, expressed in mm. Hg, in the range $$\frac{T-450}{50} < \log P_{H_2O} < 2.8,$$

where T represents the temperature in ° C. and log $P_{H_2O}$ is the Briggs logarithm of $P_{H_2O}$.

2. The process of claim 1 wherein the partial water vapor pressure is $$\frac{T-450}{50} < P_{H_2O} < 2.2.$$

3. The process of claim 1 where in the catalyst contains 0.1–1% by weight of platinum-group metals, based on the total weight of catalyst.

4. The process of claim 3 wherein the platinum-group metal is platinum.

5. The process of claim 1 wherein the catalyst is activated with an inert gas containing 0.1–2% by volume of oxygen at a maximum temperature between 380 and 450° C.

6. The process of claim 1 wherein the isomerization is carried out at temperatures between 200° C. and 300° C., a hydrogen partial pressure between 5 and 50 kg./cm.², a space velocity between 0.5 and 10 liters of liquid hydrocarbon feed/liter of catalyst/hour and a gas supply between 100 and 2500 liters of hydrogen/kg. of feed.

7. The process of claim 6 wherein the hydrogen/feed molar ratio is between 0.5:1 and 10:1.

8. The process of claim 6 wherein the space velocity is 1–3 liters of liquid hydrocarbon feed/liter of catalyst/hour and the hydrogen/feed molar ratio is between 1:1 and 3:1.

9. The process of claim 1 wherein the product obtained after isomerization is added to the original mixture of straight and branched paraffins, the branched paraffins are partly or completely removed therefrom and the remaining part is subjected to the process according to the invention.

References Cited

UNITED STATES PATENTS

| | | | |
|---|---|---|---|
| 3,428,550 | 2/1969 | Erickson et al. | 252—455 Z |
| 3,450,644 | 6/1969 | Lanewala et al. | 252—455 Z |
| 3,493,519 | 2/1970 | Kerr et al. | 252—455 Z |
| 3,551,353 | 12/1970 | Chen et al. | 252—455 Z |
| 3,609,097 | 9/1971 | Koppe | 252—420 |

CURTIS R. DAVIS, Primary Examiner

U.S. Cl. X.R.

208—140; 252—420, 455 Z